US011693759B2

(12) United States Patent
Chen et al.

(10) Patent No.: US 11,693,759 B2
(45) Date of Patent: Jul. 4, 2023

(54) PROVIDING FOR MULTI-PROCESS LOG DEBUG WITHOUT RUNNING ON A PRODUCTION ENVIRONMENT

(71) Applicant: International Business Machines Corporation, Armonk, NY (US)

(72) Inventors: Xiao Ling Chen, Beijing (CN); Qi Ye, Shanghai (CN); Wen Ji Huang, Beijing (CN); Heng Wang, Beijing (CN); Kui Zhang, Tianjin (CN)

(73) Assignee: International Business Machines Corporation, Armonk, NY (US)

( * ) Notice: Subject to any disclaimer, the term of this patent is extended or adjusted under 35 U.S.C. 154(b) by 64 days.

(21) Appl. No.: 17/320,303

(22) Filed: May 14, 2021

(65) Prior Publication Data

US 2022/0365865 A1 Nov. 17, 2022

(51) Int. Cl.
*G06F 11/36* (2006.01)

(52) U.S. Cl.
CPC ............... *G06F 11/3624* (2013.01)

(58) Field of Classification Search
CPC ............... G06F 11/3624; G06F 8/443
See application file for complete search history.

(56) References Cited

U.S. PATENT DOCUMENTS

| 9,104,797 | B1* | 8/2015 | Sekhar | ............... G06F 11/366 |
| 9,122,795 | B1 | 9/2015 | Daudel | |
| 9,740,594 | B2 | 8/2017 | Delporte | |
| 9,946,630 | B2 | 4/2018 | Beraldo Dos Santos | |
| 10,176,078 | B1 | 1/2019 | Motel | |
| 2001/0044929 | A1* | 11/2001 | Tsurugasaki | ........ G06F 11/3664 714/E11.21 |
| 2003/0177476 | A1* | 9/2003 | Sarma | ............... G06F 11/362 717/128 |
| 2011/0214023 | A1 | 9/2011 | Barlow | |
| 2014/0033181 | A1 | 1/2014 | Wang | |
| 2019/0227904 | A1 | 7/2019 | Raviv | |
| 2020/0034276 | A1 | 1/2020 | O'Dowd | |

(Continued)

FOREIGN PATENT DOCUMENTS

CN 103729283 B 2/2017

OTHER PUBLICATIONS

Y. Li, F. Wang, G. Wang, X. Liu and J. Liu, "MKtrace: An Innovative Debugging Tool for Multi-Threaded Programs on Multiprocessor Systems," 14th Asia-Pacific Software Engineering Conference (APSEC'07), 2007, pp. 510-517, doi: 10.1109/ASPEC.2007.27. (Year: 2007).*

(Continued)

*Primary Examiner* — Hanh Thi-Minh Bui
(74) *Attorney, Agent, or Firm* — Stephen R. Yoder

(57) ABSTRACT

Methods, computer program products, and/or systems are provided that perform the following operations: determining that a log multi-process debug mode is specified; obtaining a log file for debugging a source code, wherein the log file includes a plurality of log records; inserting a plurality of process identifier fields into each current log record in the log file; inserting a new log record into the log file for a created new process; and providing for performance of debugging for the source code based in part on the plurality of process identifier fields inserted into each current log record.

18 Claims, 12 Drawing Sheets

(56) References Cited

U.S. PATENT DOCUMENTS

2022/0121457 A1* 4/2022 Weimer .................. G06F 8/433

OTHER PUBLICATIONS

A. Spear, M. Levy and M. Desnoyers, "Using Tracing to Solve the Multicore System Debug Problem," in Computer, vol. 45, No. 12, pp. 60-64, Dec. 2012, doi: 10.1109/MC.2012.191. (Year: 2012).*

"Debugging programs involving multiple processes", IBM Knowledge Center, downloaded from the Internet on Mar. 3, 2021, 2 pages, <https://www.IBM.eom/support/knowledgecenter/SSLTBW_2.1.0/com.ibm.zos.v2r1.bpxa600/dpimp.htm>.

"Log Analysis Debugging Without Running on Real Production Environment", U.S. Appl. No. 17/247,397, filed Dec. 10, 2020, 39 pages.

Mell et al., "The NIST Definition of Cloud Computing", Recommendations of the National Institute of Standards and Technology, Special Publication 800-145, Sep. 2011, 7 pages.

* cited by examiner

1200

→ 1220

```
                    Debugging Session
Breakpoint 3, funB ( )  at b.c:15
(debugger) info inferior
   Num  Description      Executable
 * 3    process 1274     /home/sunny/test/P202007685/a.out
   2    process 1273     /home/sunny/test/P202007685/a.out
   1    process 1269     /home/sunny/test/P202007685/a.out
```
1222

```
Breakpoint 3, funB ( )  at b.c:15
(debugger) inferior 1
[Switching to inferior 1 [process 1269] (/home/sunny/test/P202007685/a.out) ]
[Switching to thread 1 (process 1269) ]
(debugger) info inferior
   Num  Description      Executable
   3    process 1274     /home/sunny/test/P202007685/a.out
   2    process 1273     /home/sunny/test/P202007685/a.out
 * 1    process 1269     /home/sunny/test/P202007685/a.out
```
1224

(debugger) n
main ( ) at main.c:15

FIG. 12B

PROVIDING FOR MULTI-PROCESS LOG DEBUG WITHOUT RUNNING ON A PRODUCTION ENVIRONMENT

BACKGROUND

The present invention relates generally to the field of source code debugging, and more particularly to providing for the creation of log multi-process debug and use of such log multi-process debug to facilitate source code debugging.

SUMMARY

According to an aspect of the present invention, there is a method, computer program product and/or system that performs the following operations (not necessarily in the following order): determining that a log multi-process debug mode is specified; obtaining a log file for debugging a source code, wherein the log file includes a plurality of log records; inserting a plurality of process identifier fields into each current log record in the log file; inserting a new log record into the log file for a created new process; and providing for performance of debugging for the source code based in part on the plurality of process identifier fields inserted into each current log record.

BRIEF DESCRIPTION OF THE DRAWINGS

FIGS. 12A and 12B depict a block diagram of an example inferior switch for log multi-process debugging, according to embodiments of the present invention.

DETAILED DESCRIPTION

Figure 1:
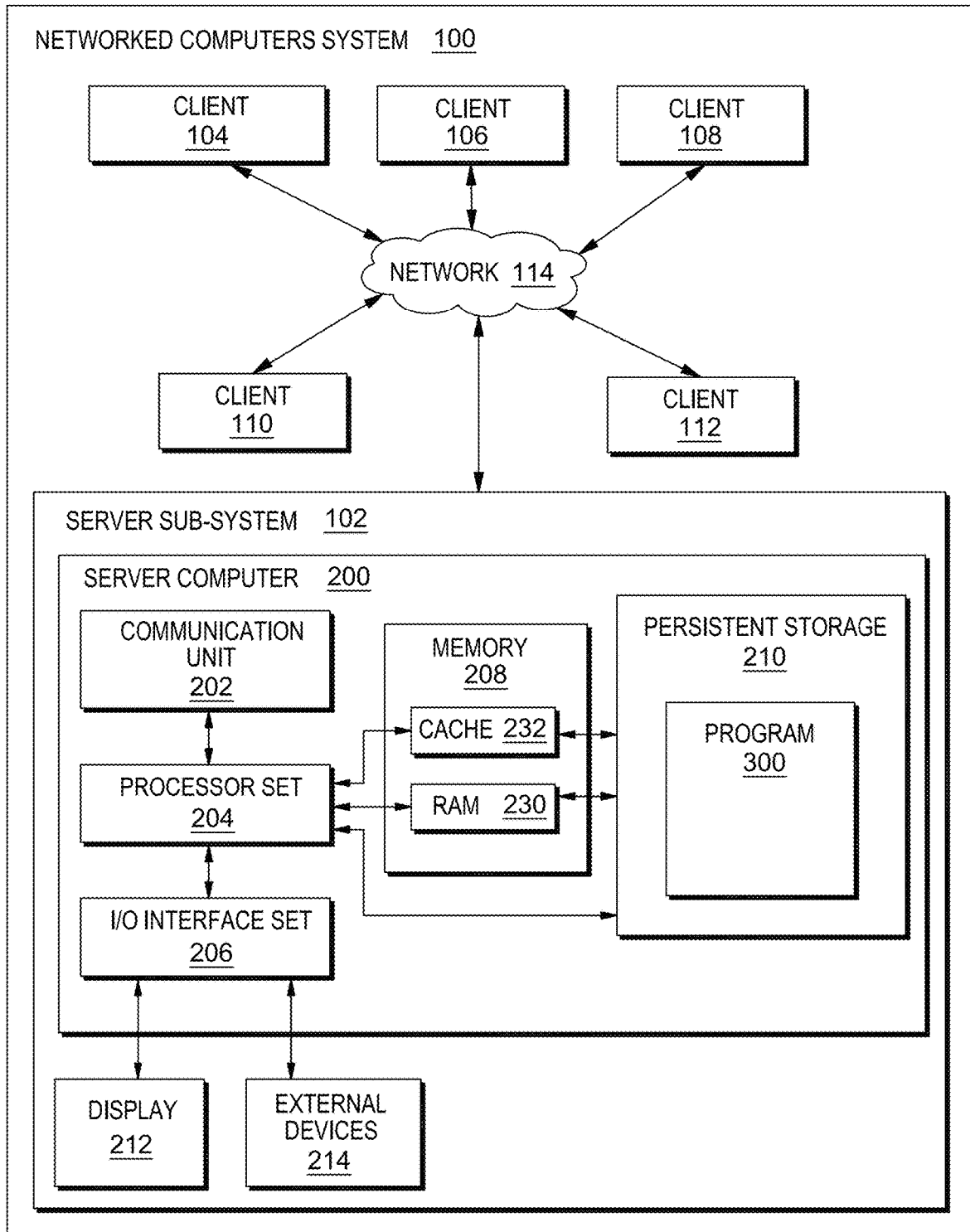
FIG. 1 depicts a block diagram view of a first embodiment of a system, according to the present invention.

According to aspects of the present disclosure, systems and methods can be provided for multi-process log debugging. In particular, systems and methods of the present disclosure can provide for extending log records to insert a plurality of process identifiers for all records and inserting new log records for each new process created. The systems and methods of the present disclosure can provide for performing debugging using the inserted process identifiers and inserted new log records. In some embodiments, for example, the systems and methods of the present disclosure can provide for multi-process log debugging, such as including attaching processes, following parent/child processes, switching to a different process, and/or the like, using the process identifiers and new created process log records inserted into the log file data. In some embodiments, debugging using the process identifiers and new records inserted into a log file can allow for debugging without running on a real production environment (e.g., without calling system application program interfaces on a running production environment).

In general, when developers receive an error report with a large record, for example, multi-process applications, collected on a production environment, debugging an application may be difficult and/or inefficient because it may not be desirable and/or possible to run a debugger with the application source code on a production environment (e.g., customer production environment, etc.) and/or share application source code and debug information with external entities (e.g., customers). Additionally, some debuggers may not be able to perform multi-process debugging, such as viewing process status, switching inferiors, follow parent/child process mode, and/or the like without debugging with source code on a production environment and/or sharing source code and debug information with external entities. Such situations may require a developer to read large log files with a personal understanding of the multi-process status in source code. Often, multi-process can make the running flow of an application complicated and as such, bug locating for multi-process applications be reading large log files can be difficult and inefficient.

Accordingly, systems and methods of the present disclosure can provide for inserting a plurality of process identifier fields into each current log record in a log file. The systems and methods of the present disclosure can provide for inserting a new log record with a valid new process identifier into the log file for any new process creation. In some embodiments, the systems and methods of the present disclosure can provide for multi-process log debugging, such as, for example, supporting attach process mode, follow parent/child process mode, inferior view, inferior switch, and/or the like, by using the process identifiers inserted into the log records and/or the new log records inserted into the log file for new process creation. Embodiments of the present disclosure can allow for locating root cause relative to multi-process applications by debugging a log file without running on a real production environment (e.g., customer production environment, etc.). Embodiments of the present disclosure can provide for quicker and/or more efficient resolution, provide for more flexible debugging, and/or the like. In some embodiments, the debugging does not require insertion and/or changes to hard-coded source code. In some embodiments, the debugging may not impact some current debug modes, for example, normal debug, core dump support, and/or the like.

This Detailed Description section is divided into the following sub-sections: The Hardware and Software Environment; Example Embodiments; Further Comments and/or Embodiments; and Definitions.

The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine-readable instructions and/or data that can be used to create, manage, and control certain software functions, such as will be discussed in detail, below, in the Example Embodiment sub-section of this Detailed Description section. As an example, a program 300 can provide mapping of debug data and log file data with process information and associated information, provide for log multi-process debugging using process information and associated information inserted in log file, and/or the like.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). For example, program 300 may include machine readable and performable instructions to provide for performance of method operations as disclosed herein. In this particular embodiment, persistent storage 210 includes a magnetic hard disk drive. To name some possible variations, persistent storage 210 may include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor, a smart phone/tablet display screen, and/or the like.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Example Embodiments

Figure 2:
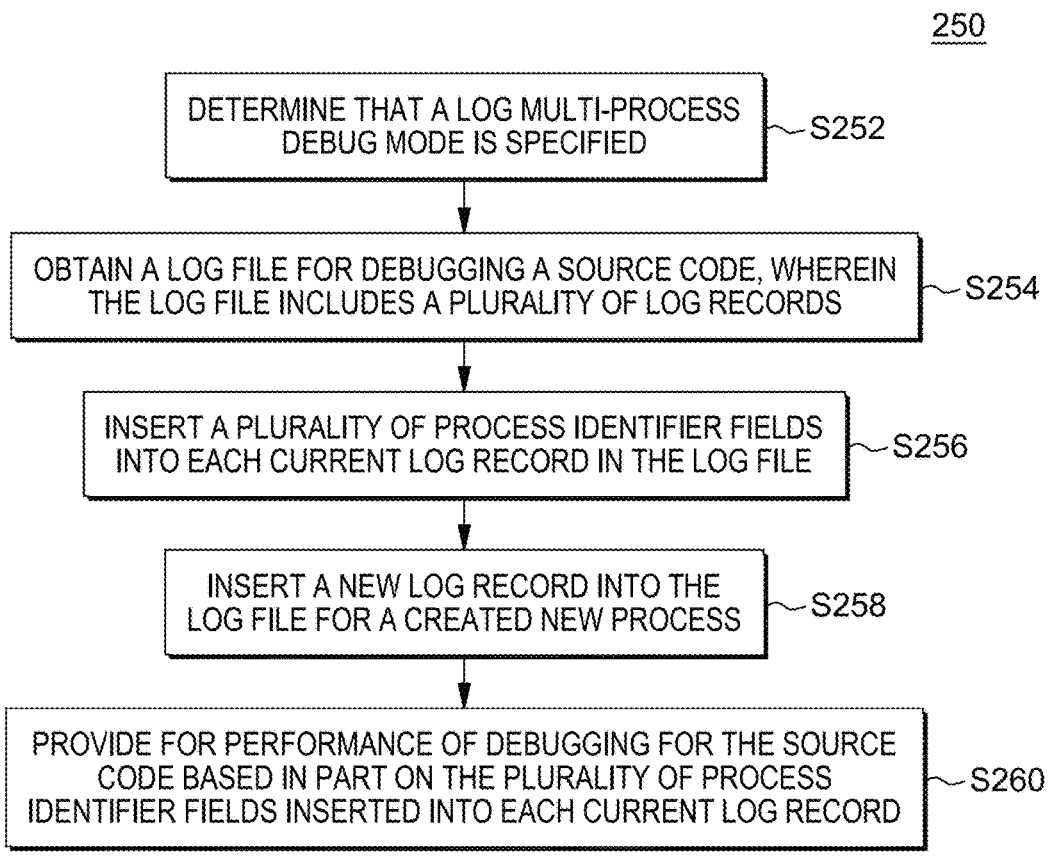
FIG. 2 depicts a flowchart showing a first embodiment method performed, at least in part, by the first embodiment system.
Figure 3:
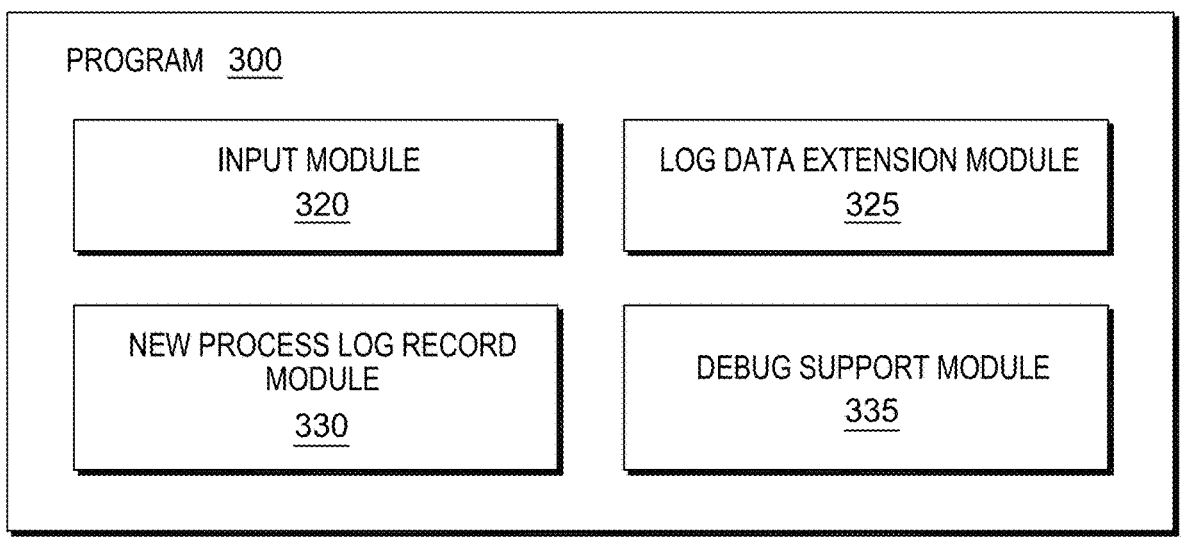
FIG. 3 depicts a block diagram showing an example machine logic (for example, software) portion of the first embodiment system.

FIG. 2 shows flowchart 250 depicting a computer-implemented method, according to embodiment(s) of the present invention. FIG. 3 shows a program 300 for performing at least some of the method operations of flowchart 250. This method and associated software will now be discussed, over the course of the following paragraphs, with extensive reference to FIG. 2 (for the method operation blocks) and FIG. 3 (for the software blocks).

As illustrated in FIG. 2, in some embodiments, operations for providing log multi-process debug without running on production environment begin at operation S252, where a computing system (e.g., server computer 200 of FIG. 1 or the like) determine that a log multi-process debug mode is specified. For example, the computing system can check an option, environment variable, and/or the like to determine whether multi-process debug is specified. As an example, an input module 320 of FIG. 3, debug support module 335 of FIG. 3, and/or the like can provide for determining that a log multi-process debug mode is specified for source code of an application.

Processing proceeds to operation S254, where the computing system (e.g., server computer 200 of FIG. 1 or the like) obtains a log file for debugging a source code. The log file includes a plurality of log records associated with the application source code to be debugged. In some embodiments, the computing system. As an example, an input module 320 of FIG. 3 and/or the like can provide for obtaining a log file for the application to be debugged and loading log records (e.g., debug information, etc.) from the log file. In some embodiments, the debug information loaded from the log file can include program counter (PC) value(s) in a debugging information entry (DIE).

Processing proceeds to operation S256, where the computing system (e.g., server computer 200 of FIG. 1 or the like) generates and inserts a plurality of process identifier fields into each current log record in the log file. For example, in some embodiments, the computing system can generate and/or insert process identifier fields including a current process identifier field (e.g., CurrentPID, etc.), a parent process identifier field (e.g., ParentPID, etc.), a grandparent process identifier field (e.g., gParentPID, etc.), a new process identifier field (e.g., NewPID, etc.), and/or the like for each of the log records. In this example, the CurrentPID identifies a current process, the ParentPID identifies a parent process which creates the current process, the gParentPID identifies a grandparent process which creates the parent process, and the NewPID identifies a child process which is created and/or forked in the current process. As an example, a log data extension module 325 of FIG. 3 and/or the like may generate and/or insert the plurality of process identifier fields into all the current log records data. In some embodiments, the computing system can obtain an option, environment variable, and/or the like that defines a depth of a process family tree, for example, "–multiProc=N" where N is the depth of the family tree. The computing system can use the depth of the process family tree to determine the plurality of process identifier fields to be inserted into the log records. As an example, if an option and/or environment variable defines N as 4, process identifier fields can be generated including CurrentPID, ParentPID, gParentPID, and ggParentPID. In some embodiments, a compiler (e.g., associated with the computing system, etc.) can generate and/or insert the process identifier fields into the log records. In some embodiments, for example, the compiler and/or the like can insert and populate the identifier fields in the log records based on the application source code being debugged.

Processing proceeds to operation S258, where the computing system (e.g., server computer 200 of FIG. 1 or the like) can insert a new log record into the log file for a created new process (e.g., a child process created/forked from the current process, etc.). As an example, a new process log record module 330 of FIG. 3 and/or the like can insert a new log record into the log file for a created new process. compiler (e.g., associated with the computing system, etc.) can generate and/or insert the new log record into the log file for each created new process. For example, in some embodiments, if an option and/or environment variable are set for multi-processing and forking, such as "-fork && -multiproc", the compiler (e.g., computing system) can insert a new log record for new process creation.

Processing proceeds to operation S260, where the computing system (e.g., server computer 200 of FIG. 1 or the like) can provide for and/or facilitate performance of debugging for the source code based in part on the plurality of process identifier fields inserted into each current log record. As an example, a debugger and/or the like can provide for and/or facilitate debugging of source code using the log records and the inserted plurality of process fields. For example, in some embodiments, the extended log record process identifier data and/or other inserted data can be provided to perform and/or support debugging operations, such as an attach debug mode, a parent/child process mode, an inferior view, an inferior switch, and/or the like. In some embodiments, a computing system (e.g., debugger, etc.) can provide for performing multi-process debugging without running in a real production environment by using the log record process identifier data and/or other data inserted into the log file, for example, by a compiler.

As an example, in some embodiments, a computing system (e.g., debugger, etc.) can load one or more log records from a log file to get loading multi-process information including parent process identifier data and child process identifier data. The computing system (e.g., debugger, etc.) can provide a stack view and/or variable view using specified process identifier(s). The computing system (e.g., debugger, etc.) can locate log records whose process identifier (e.g., current process identifier, etc.) is equal to the corresponding child process identifier in parent log records. The computing system (e.g., debugger, etc.) facilitates debugging by repeatedly providing stack view and/or variable view using specified process identifier and locating log records whose process identifier is equal to the corresponding child process.

Further Comments and/or Embodiments

Additionally, some embodiments of the present disclosure can include using the inserted process identifier fields to support an attach debug mode to attach a process. Accordingly, in some embodiments, a computing system (e.g., server computer 200 of FIG. 1 or the like) can obtain a specified process identifier. The specified process identifier can be provided by a user, for example, and allows for searching the current process identifier field (e.g., CurrentPID, etc.) in the log records for a process to be attached. In some embodiments, the computing system can search the log file and identify a first log record having a current process identifier field (e.g., CurrentPID, etc.) equal to the specified process identifier. The computing system can update a debugger program counter (PC) address (e.g., pcAddr field, etc.) with a current address (e.g., currentAddr, etc.) recorded in the identified log record. In some embodiments, the computing system (e.g., debugger, etc.) can use the identified log record current address field to update the program counter to attach a process instead of calling a system application programming interface (API) on a real running environment.

Additionally, some embodiments of the present disclosure can include using the inserted process identifier fields to support a debug parent/child process mode. Accordingly, in some embodiments, a computing system (e.g., server computer 200 of FIG. 1 or the like) can obtain a next log record included in the log file. The computing system (e.g., debugger, etc.) can determine if a new process identifier (e.g., NewPID, etc.) is valid, indicating that a new process is created by the current process identified in the log record. In some embodiments, a new process identifier is valid if it is greater than zero (0). For example, a zero (0) value in a new process identifier field (e.g., NewPID, etc.) can indicate that a new process (e.g., child process, etc.) is not created by the current process identified in a log record.

Additionally, in some embodiments, the computing system (e.g., debugger, etc.) can search the log file and identify a first matched log record having a current process identifier field (e.g., CurrentPID, etc.) equal to the new process identifier (e.g., NewPID, etc.) recorded in the obtained next log record. The computing system (e.g., debugger, etc.) can update a debugger program counter (PC) address (e.g., pcAddr field, etc.) using a current address field (e.g., currentAddr, etc.) recorded in the identified first matched log record to provide/support a debug parent/child process mode. In some embodiments, the computing system (e.g., debugger, etc.) can use the current address field recorded in the identified first matched log record to update a program counter for a parent/child process mode instead of calling a system API on a real running environment.

Additionally, some embodiments of the present disclosure can include using the inserted process identifier fields to support a debug inferior view. Accordingly, in some embodiments, a computing system (e.g., server computer 200 of FIG. 1 or the like) can obtain a current process identifier (e.g., CurrentPID, etc.) for a process currently being inspected. The computing system (e.g., debugger, etc.) can identify a current process log record included in the log file having a same current process identifier field (e.g., CurrentPID, etc.) as the process currently being inspected. The computing system (e.g., debugger, etc.) can obtain a process identifier field value for each family process identifier field (e.g., ParentPID, gParentPID, NewPID, etc.) in the current log record having a value greater than one (1). In some embodiments, each family process identifier field having a value greater than one (1) indicates that a family process identified by the field is associated with the current log record. Each family process identifier field value obtained represents a process that is a member of a process family tree for the current log record. The computing system (e.g., debugger, etc.) can provide debug inferior view based on the current log record and the obtained process identifier field values from the current log record. In some embodiments, the computing system (e.g., debugger, etc.) can search the log file to identify log records for process that are members of the process family tree for the current log record (e.g., identified by a family process identifier field value of the current log record, etc.). In some embodiments, the computing system (e.g., debugger, etc.) can use the obtained process identifier field values from the current log record to provide inferior view instead of calling a system application programming interface (API) on a real running environment.

Additionally, some embodiments of the present disclosure can include using the inserted process identifier fields to support a debug inferior switch. Accordingly, in some embodiments, a computing system (e.g., server computer 200 of FIG. 1 or the like) can provide for switching to a different inferior process (e.g., listed in inferior view, etc.). In some embodiment, for interior switch, the computing system (e.g., debugger, etc.) can obtain a target process identifier. The target process identifier (e.g., targetPID, etc.) can represent a current process identifier of the different inferior process to be switched. In some embodiment, the computing system e.g., debugger, etc.) can determine whether the target process identifier (e.g., targetPID, etc.) is located in the process family tree for the current log record. If the target process identifier (e.g., targetPID, etc.) is in the process family tree for the current log record, the computing system (e.g., debugger, etc.) can obtain a child process identifier of the different inferior process. The computing system (e.g., debugger, etc.) can identify a located log record included in the log file that has a new process identifier field (e.g., NewPID, etc.) equal to the child process identifier for the different inferior process. The computing system (e.g., debugger, etc.) can update a debugger current program counter and a debugger current process identifier based on the located log record.

Figure 4:
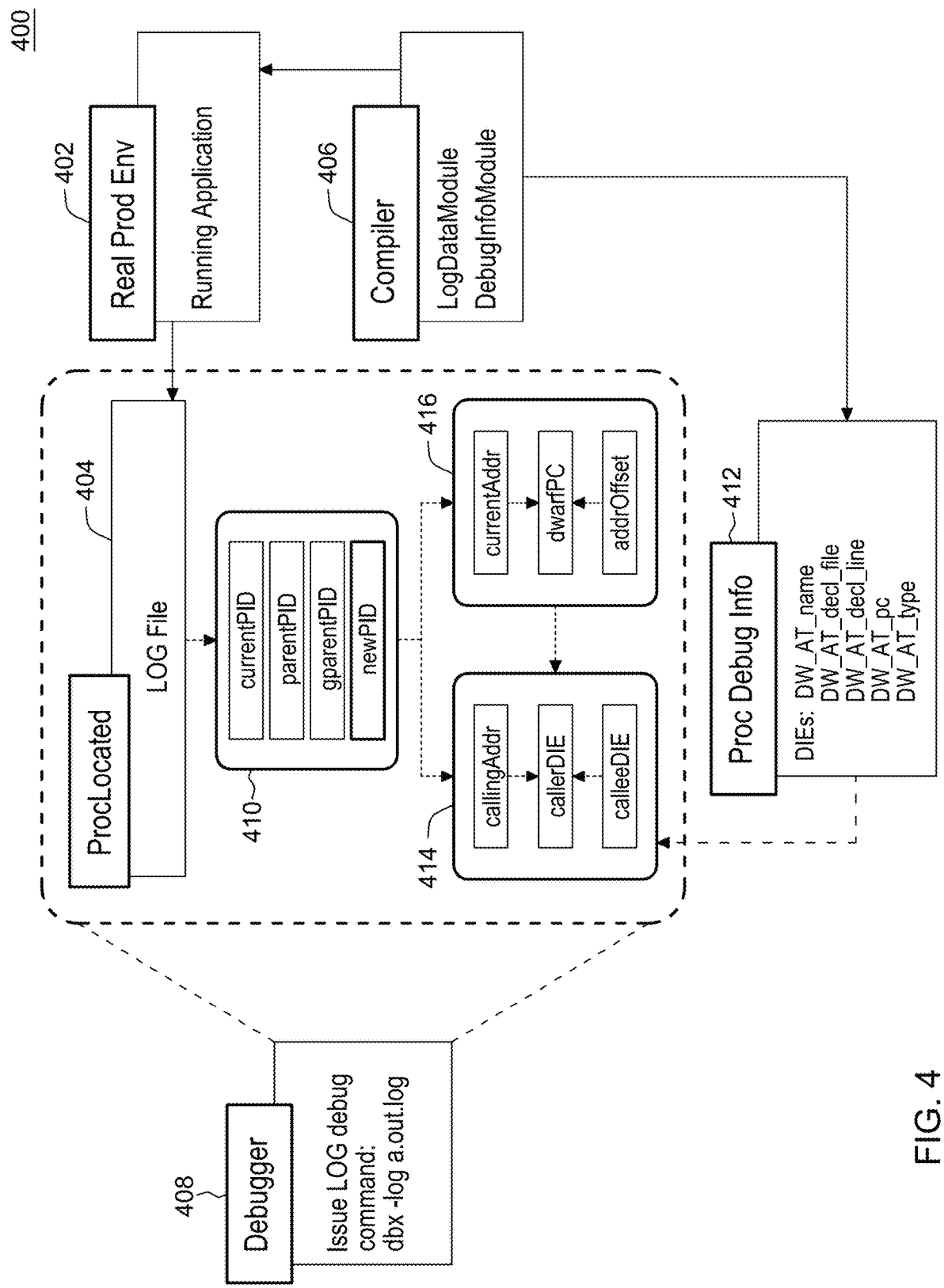
FIG. 4 depicts a block diagram of an example system architecture for providing a multi-process log debug, according to embodiments of the present invention.

FIG. 4 depicts a block diagram of an example architecture 400 for providing multi-process log debug, according to embodiments of the present invention. As illustrated in FIG. 4, the architecture 400 can include a log file 404, a debugger 408, and/or the like. The architecture 400 can also include, communicate with, and/or otherwise be associated with a running application 402 in a real production environment that is to be debugged, a compiler 406, and/or the like. In some embodiments, a debug info file 412 can be provided and/or generated and can include debugging information entries (DIE) for the running application. In some embodiments, a debug info file 412 can be generated by a compiler 406 (e.g., source code compiled with option "-g", etc.), for example, via a DebugInfoModule and/or the like. The running application 402, compiler 406, and/or the like can generate and/or update the log file 404.

The debugger 408 can initiate a log debug, for example, by issuing log debug command(s) and/or the like. The debugger 408 can obtain the log file 404. The compiler 406, and/or the like can generate and/or insert a plurality of process identifier fields 410 into the log records included in the log file 404. In some embodiments, for example, the process identifier fields 410 can include a currentPID field, parentPID field, a gparentPID field, a newPID field, and/or the like. In some embodiments, for example, the compiler 406 and/or the like can insert and populate the identifier fields in the log records based on the application source code being debugged.

The compiler 406 can provide the debug info file 412 to the debugger 408 and/or the like for use in the debugging. The debugger 408, compiler 406, and/or the like can generate, identify, update, etc. current process data 416, calling process data 414, and/or the like for the debugging. In some embodiments, for example, the current process data 416 can include a current program execute address (e.g., memory address, current PC, etc.), an address offset, a debug program counter (e.g., dwarfPC, etc.), and/or the like. In some embodiments, the current program execute address (e.g., currentAddr, etc.) and address offset (e.g., addrOffset, etc.) can be used to populate and/or update the debug program counter (e.g., dwarfPC, etc.). For example, in some embodiments, the debugger 408 can update the debug program counter (e.g., dwarfPC, etc.) using the current program execute address (e.g., currentAddr, etc.) instead of calling a system API. In some embodiments, the calling process data 414 can include, for example, a calling address (e.g., entry address of code for a called routine, return code, etc.), debugging information entry (DIE) for the callee process, caller process DIE, and/or the like. In some embodiments, the debugger 408 can obtain the calling address (e.g., callingAddr, etc.) for the caller routine in a current corresponding log record instead of reading a calling address for the caller routine from a saved area of the callee routine. The debugger 408 can then locate caller routine DIE using the calling address (e.g., callingAddr, etc.).

Figure 5:
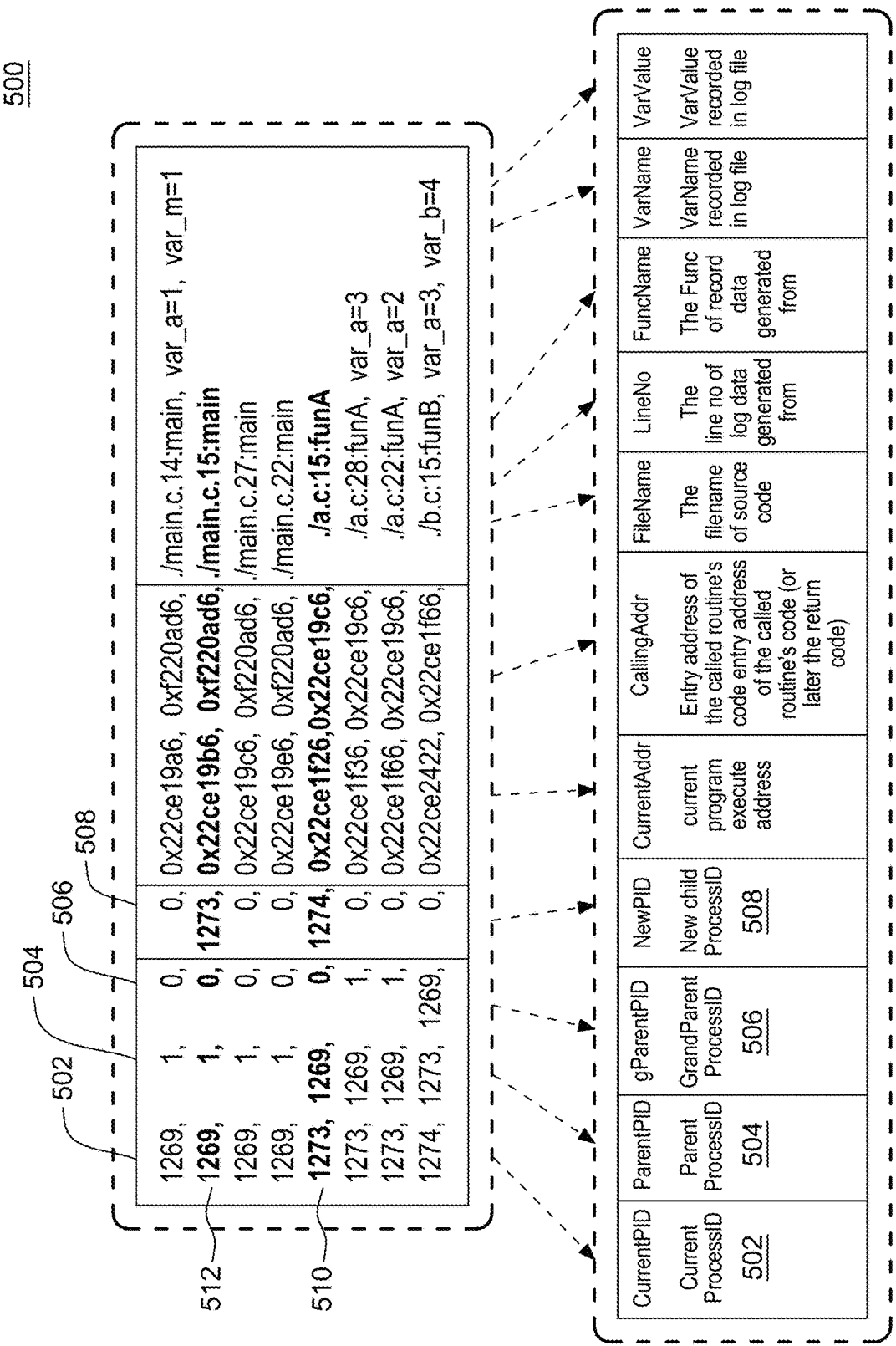
FIG. 5 depicts an example of log data extension for records in a log file, according to embodiments of the present invention.

FIG. 5 depicts an example of log data extension 500 for a log file, according to embodiments of the present invention. As illustrated in FIG. 5, a computing system (e.g., complier etc.) can generate and insert process identifier fields into all current log records in a log file. In some embodiments, for example, a log file may contain record fields including a current program execute address, e.g., CurrentAddr, an entry address of code for a called routine or a return code address, e.g., CallingAddr, a file name of the source code, e.g., FileName, a line number of generated log data, e.g., LineNo, a function name for record data generated, e.g., FuncName, variable name(s) recorded in the log file, e.g., VarName, variable value(s) recorded in the log file, e.g., VarValue, and/or the like.

In some embodiments, the computing system (e.g., complier etc.) can insert a number of process identifier fields based on a depth of a process family tree, for example. As illustrated in FIG. 5, the computing system (e.g., complier etc.) can generate and insert process identifier fields including CurrentPID field 502, ParentPID field 504, gParentPID field 506, NewPID field 508, and/or the like for each log record.

The CurrentPID field 502 identifies the current process identifier (e.g., CurrentPID) associated with the log record. The ParentPID field 504 can identify a process identifier (e.g., ParentPID) which creates the current process, if there is a parent process. The gParentPID field 506 can identify a process identifier (e.g., gParentPID) which creates the parent process of the current process, if there is a grandparent process. The NewPID field 508 can identify a process identifier (e.g., NewPID) of a child process which may be created and/or forked in the current process, if a child process is created.

As illustrated in FIG. 5, a computing system (e.g., complier etc.) can generate and insert new log records for any new process creation. For example, a new record 510 can be inserted for a current process identifier 1273, with parent process identifier 1269 and new process identifier (e.g., child process, etc.) 1274. A new record 512 can be inserted for a current process identifier 1269 with new process identifier (e.g., child process, etc.) 1273.

Figure 6:
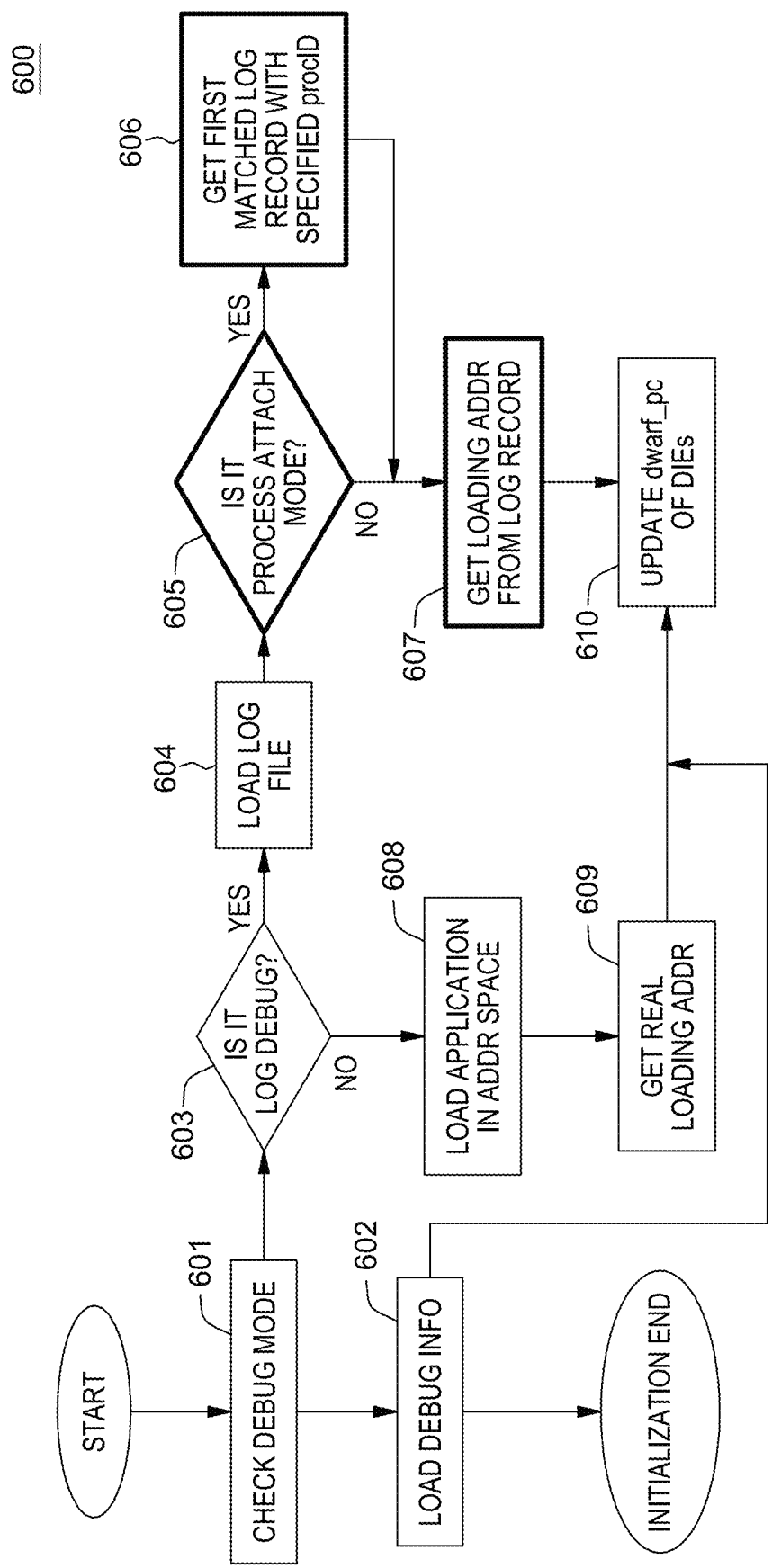
FIG. 6 depicts a workflow diagram for an attach mode for log multi-process debugging, according to embodiments of the present invention.

FIG. 6 depicts a workflow diagram 600 for attach mode for log multi-process debugging, according to embodiments of the present invention. In some embodiments, the computing system can provide for supporting an attach debug mode using the inserted process identifier fields to attach a process. As illustrated in FIG. 6, in some embodiments, operations can begin at operation 601, where a computing system (e.g., debugger, etc.) can check a debug mode, for example, based on defined option(s), environment variable(s), and/or the like. Based on the determined debug mode, processing can proceed to operation 602, where the computing system (e.g., debugger, etc.) can load debug information or processing can proceed to operation 603, where the computing system can determine if this is a multi-process log debug, for example, based on defined option(s), environment variable(s), and/or the like.

When the computing system determines that this is a multi-process log debug at operation 603, processing proceeds to operation 604, where the computing system can load a log file. Processing proceeds to operation 605, where the computing system can determine if this is a process attach mode. When the computing system determines that this is a process attach mode, processing proceeds to operation 606, where the computing system can search the log file and obtain a first matched log record with a specified process identifier (e.g., the identifier for the process to attach, etc.). For example, the computing system can identify a first matched log record having a current process identifier (e.g., CurrentPID, etc.) equal to the specified process identifier. Processing proceeds to operation 607, where the computing system can get a loading address for the process from the first matched log record. For example, the computing system can obtain a current address (e.g., CurrentAddr, etc.) to execute the process recorded in the first matched log record. Processing proceeds to operation 610, where the computing system can update a debugger program counter (e.g., dwarfPC, etc.) based on the loading address (e.g., CurrentAddr, etc.).

When the computing system determines that this is not a process attach mode at operation 605, processing proceeds to operation 607, where the computing system can get a loading address from a current log record. Processing proceeds to operation 610, where the computing system can update a debugger program counter (e.g., dwarfPC, etc.) based on the loading address.

When the computing system determines that this is not a multi-process log debug at operation 603, processing proceeds to operation 608, where the computing system can load an application in an address space. Processing proceeds to operation 609, where the computing system can get a real loading address. Processing proceeds to operation 610, where the computing system can update a debugger program counter (e.g., dwarfPC, etc.) based on the real loading address.

After loading debug information at operation 602, processing proceeds to operation 610, where the computing system can update a debugger program counter (e.g., dwarfPC, etc.) based on the real loading address (or loading address from log record).

Figure 7:
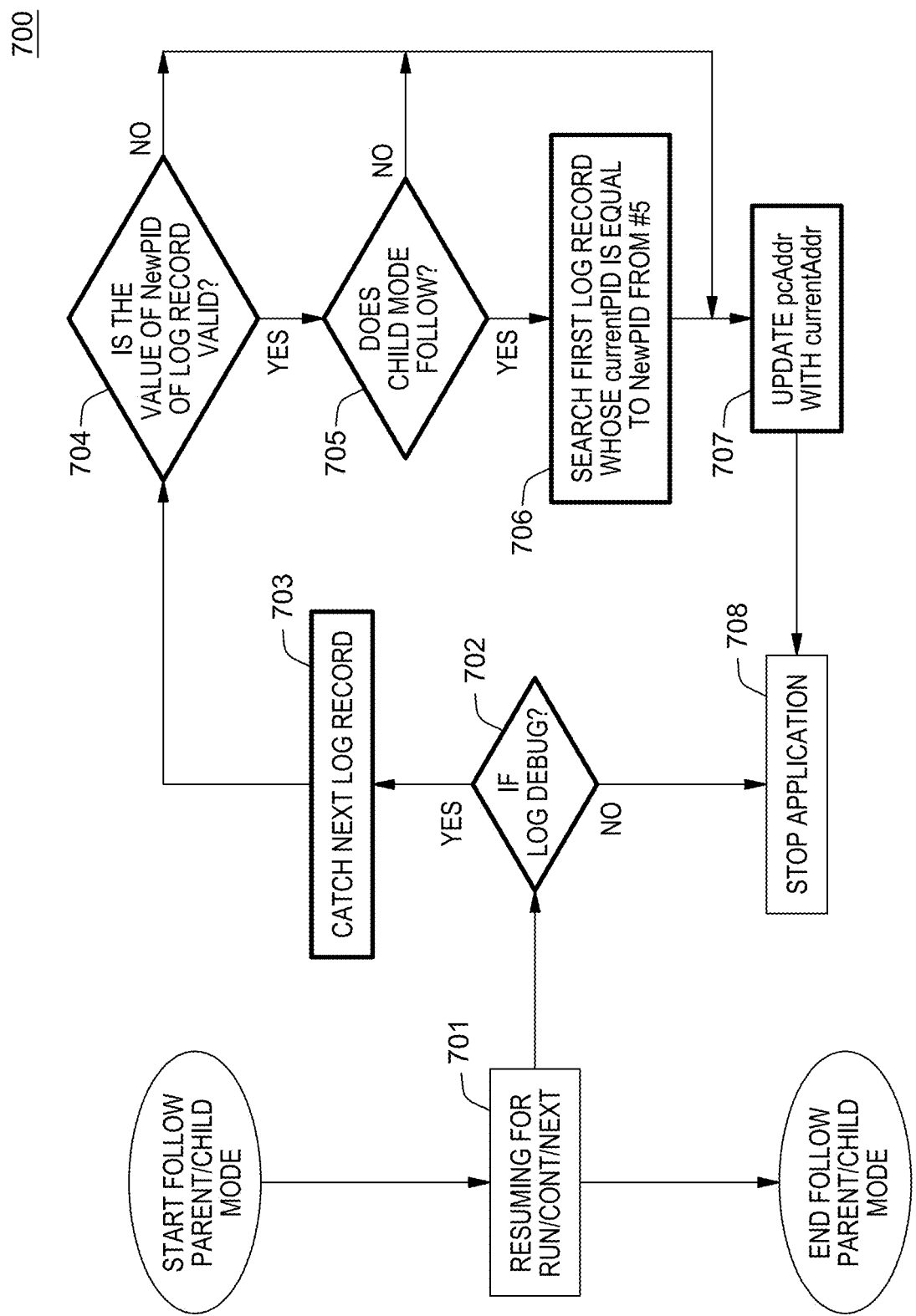
FIG. 7 depicts a workflow diagram for a parent/child mode follow for log multi-process debugging, according to embodiments of the present invention.

FIG. 7 depicts a workflow diagram 700 for a parent/child mode follow for log multi-process debugging, according to embodiments of the present invention. In some embodiments, the computing system can provide for supporting a parent/child process mode using the inserted process identifier fields to attach a process. As illustrated in FIG. 7, in some embodiments, operations can begin at operation 701, where a computing system (e.g., debugger, etc.) can initiate a parent/child mode and resume for run/cont/next. Processing proceeds to 702 where the computing system can determine if this is a multi-process log debug, for example, based on defined option(s), environment variable(s), and/or the like.

When the computing system determines that this is a multi-process log debug at operation 702, processing proceeds to operation 703, where the computing system can obtain a next log record included in the log file. Processing proceeds to operation 704, where the computing system can determine if a new process identifier field value (e.g., NewPID, etc.) of the log record is valid, indicating that a new process (e.g., child process, etc.) is created by the current process identified by the log record.

When the computing system determines that the new process identifier field value (e.g., NewPID, etc.) of the log record is valid at operation 704, processing proceeds to operation 705, where the computing system can determine if this is a child process follow mode. When the computing system determines that this is a child process follow mode at operation 705, processing proceeds to operation 706, where the computing system can search the log file and identify a first log record having a current process identifier filed (e.g., CurrentPID, etc.) equal to the new process identifier field (e.g., NewPID, etc.) recorded in the obtained next log record (e.g., operation 703). Processing proceeds to operation 707, where the computing system can update a program counter address (e.g., pcAddr, etc.) using a current address field (e.g., currentAddr, etc.) recorded in the first log record identified at operation 706. Processing proceeds to operation 708, where the computing system can stop the application.

When the computing system determines that this is not a child process follow mode at operation 705, processing proceeds to operation 707, where the computing system can update a program counter address (e.g., pcAddr, etc.) using a current address field (e.g., currentAddr, etc.) recorded in a current log record. Processing proceeds to operation 708, where the computing system can stop the application.

When the computing system determines that the new process identifier field value (e.g., NewPID, etc.) of the log record is not valid at operation 704, processing proceeds to operation 707, where the computing system can update a program counter address (e.g., pcAddr, etc.) using a current address field (e.g., currentAddr, etc.) recorded in a current log record. Processing proceeds to operation 708, where the computing system can stop the application.

When the computing system determines that this is not a multi-process log debug at operation 702, processing proceeds to operation 708, where the computing system can stop the application.

Figure 8:
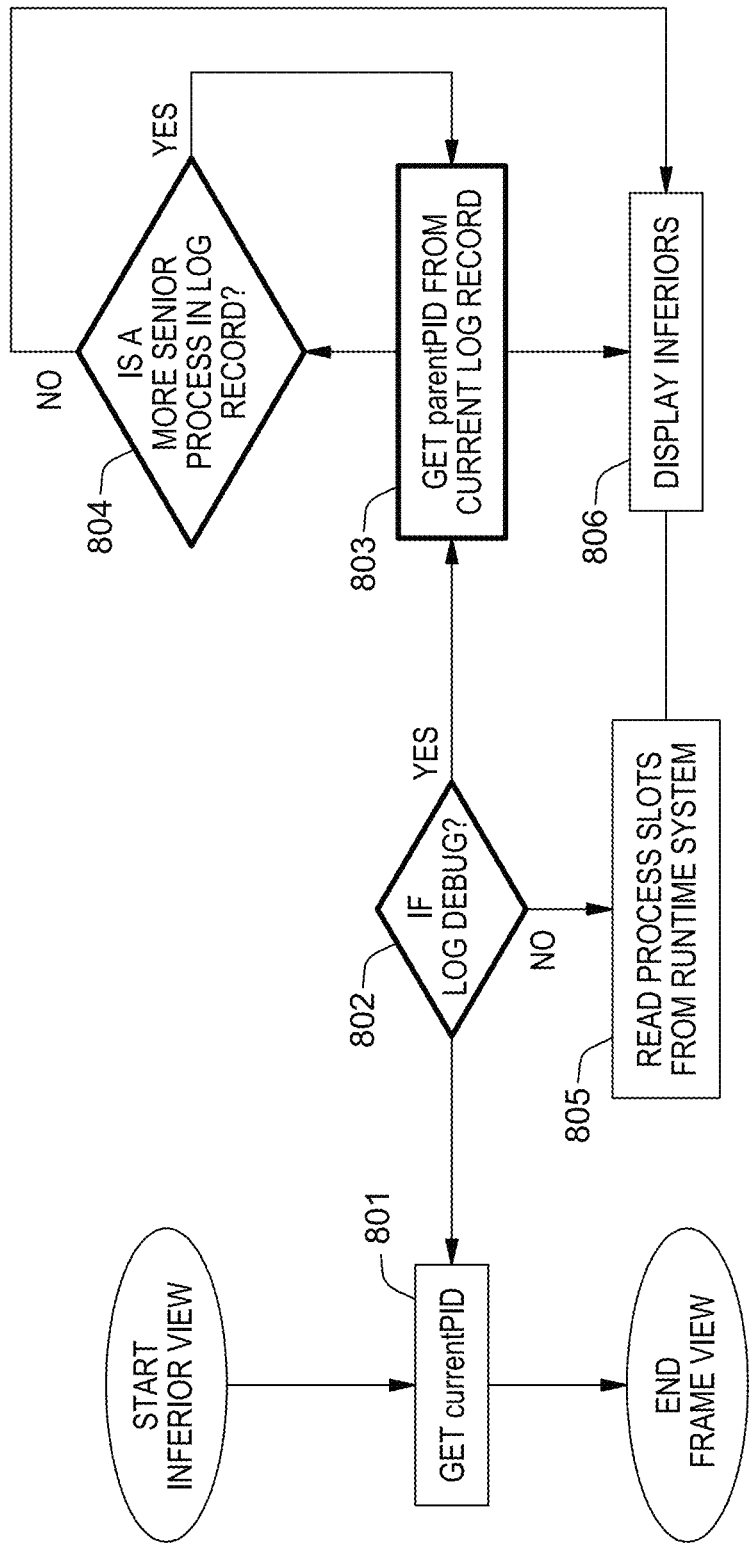
FIG. 8 depicts a workflow diagram for an inferior view for log multi-process debugging, according to embodiments of the present invention.

FIG. 8 depicts a workflow diagram 800 for an inferior view for log multi-process debugging, according to embodiments of the present invention. In some embodiments, the computing system can provide for supporting an inferior view using the inserted process identifier fields. As illustrated in FIG. 8, in some embodiments, operations can begin at operation 801, where a computing system (e.g., server computer 200 of FIG. 1 or the like) can obtain a current process identifier (e.g., in CurrentPID, etc.) for a process currently being inspected. Processing proceeds to 802 where the computing system can determine if this is a multi-process log debug, for example, based on defined option(s), environment variable(s), and/or the like.

When the computing system determines that this is a multi-process log debug at operation 802, processing proceeds to operation 803, where the computing system can obtain a family process identifier field value (e.g., parent process, ParentPID, etc.) in the current log record (e.g., if there is a parent process, etc.). Processing proceeds to operation 804, where the computing system can determine if there is a more senior process than the family process identifier obtained at operation 803. When the computing system determines that there is a more senior process than the last family process identifier obtained at operation 803, processing returns to operation 803, where the computing system can obtain a next more senior family process identifier field value (e.g., grandparent process, gParentPID, etc.) in the current log record. When the computing system determines that there is not a more senior process than the last family process identifier obtained at operation 803, processing proceeds to operation 806, where the computing system can display inferior view based on the family process identifiers.

When the computing system determines that this is not a multi-process log debug at operation 802, processing proceeds to operation 805, where the computing system can read process slots from a runtime system.

Figure 9:
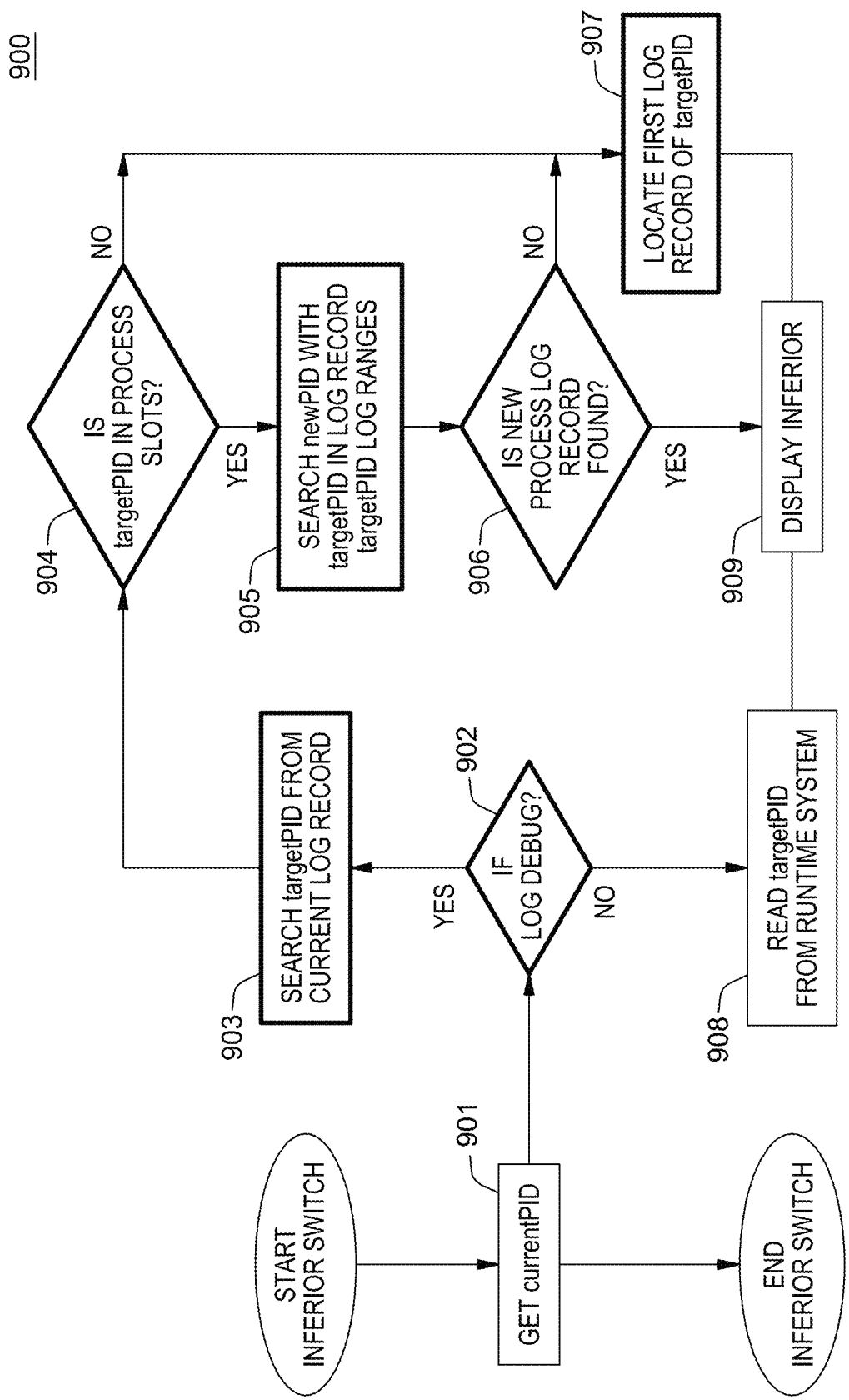
FIG. 9 depicts a workflow diagram for an inferior switch for log multi-process debugging, according to embodiments of the present invention.

FIG. 9 depicts a workflow diagram 900 for an inferior switch for log multi-process debugging, according to embodiments of the present invention. In some embodiments, the computing system can provide for supporting an inferior switch using the inserted process identifier fields. As illustrated in FIG. 9, in some embodiments, operations can begin at operation 901, where a computing system (e.g., server computer 200 of FIG. 1 or the like) can obtain a current process identifier (e.g., in CurrentPID, etc.). Processing proceeds to 902 where the computing system can determine if this is a multi-process log debug, for example, based on defined option(s), environment variable(s), and/or the like.

When the computing system determines that this is a multi-process log debug at operation 902, processing proceeds to operation 903, where the computing system can search for a target process identifier (e.g., target PID, etc.) in a current log record. The target process identifier (e.g., targetPID, etc.) can represent a current process identifier of a different/new inferior to be displayed. In some embodiment, searching for a target process identifier (e.g., target PID, etc.) in a current log record provides for determining whether the target process identifier (e.g., targetPID, etc.) is in the process family tree for the current log record. Processing proceeds to operation 904, where the computing system can determine whether the target process identifier (e.g., targetPID, etc.) is found in a process identifier field of the current record (e.g., whether the target process identifier is in the process family tree).

When the computing system determines that the target PID is found in a process identifier field of the current record at operation 904, processing proceeds to operation 905, where the computing system can search the log file for a new process log record having a new process identifier (e.g., NewPID, etc.) matching the target process identifier (e.g., targetPID, etc.). Processing proceeds to operation 906, where the computing system can determine whether a new process log record is found at operation 905. When the computing system determines that a new process log record is found at operation 906, processing proceeds to operation 909, where the computing system can display the new inferior, for example, based on the new process log record.

When the computing system determines that a new process log record is not found at operation 906, processing proceeds to operation 907, where the computing system can locate a first log record with the target process identifier (e.g., targetPID, etc.). Processing proceeds to operation 909, where the computing system can display the new inferior, for example, based on the located first log record.

When the computing system determines that the target PID is not found in a process identifier field of the current record at operation 904, processing proceeds to operation 907, where the computing system can locate a first log record with the target process identifier (e.g., targetPID, etc.). Processing proceeds to operation 909, where the computing system can display the new inferior, for example, based on the located first log record.

When the computing system determines that this is not a multi-process log debug at operation 902, processing proceeds to operation 908, where the computing system can read a target process identifier (e.g., target PID, etc.) from a runtime system to display a new inferior. Processing proceeds to operation 909, where the computing system can display the new inferior, for example, based on the runtime system.

Figure 10:
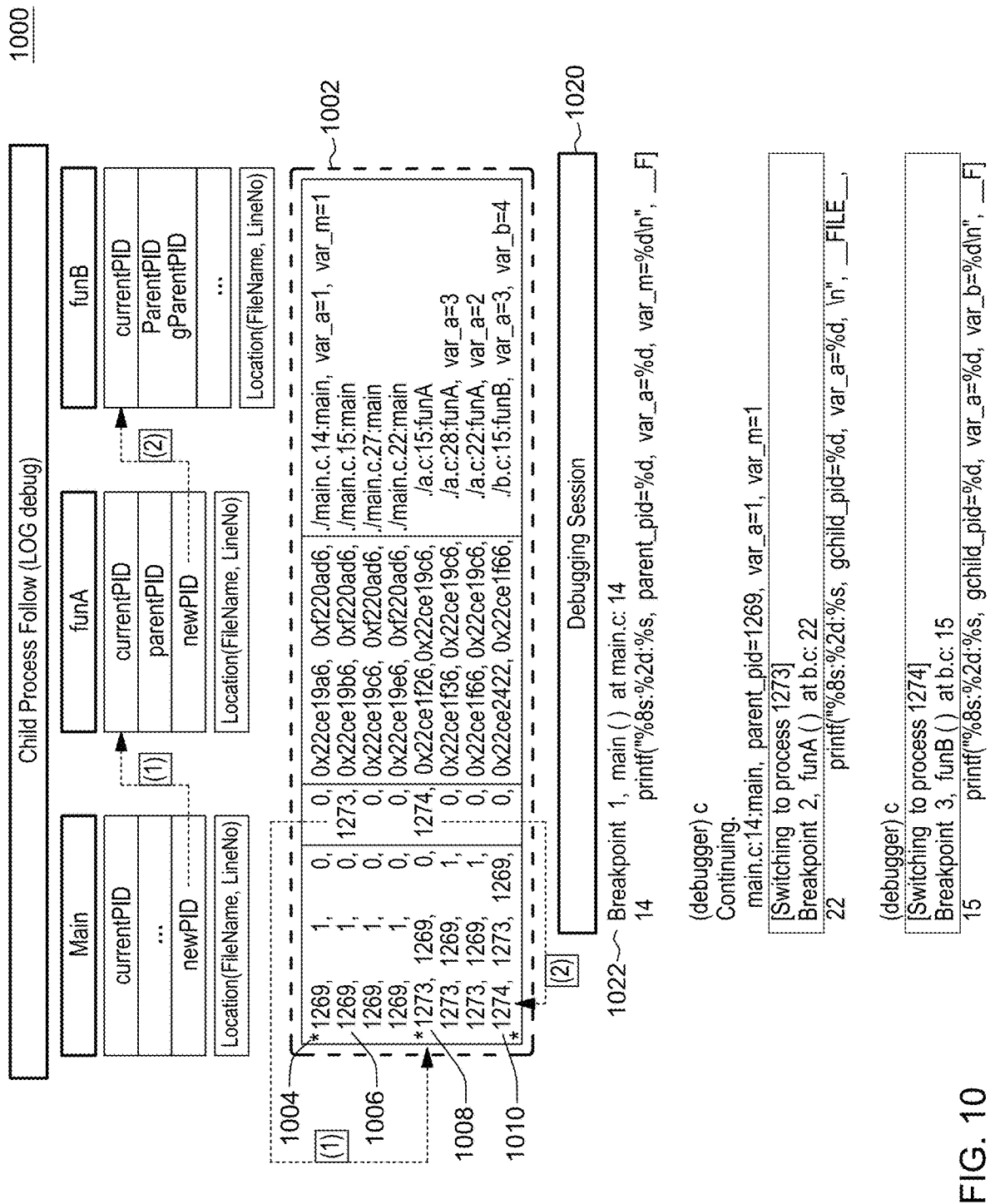
FIG. 10 depicts a block diagram of an example parent/child follow for log multi-process debugging, according to embodiments of the present invention.

FIG. 10 depicts a block diagram of an example parent/child follow mode 1000 for log multi-process debugging, according to embodiments of the present invention. As illustrated in FIG. 10, a log file 1002 is obtained for a multi-process log debug. The asterisk at log record 1004 indicates that the process of log record 1004 (e.g., process 1269) is currently being inspected by the debugger.

As illustrated in debugging session 1020, a debuggee may stop at a stop 1022 which is identified as line 14 of a program file main.c. The debugger fetches a next log record 1006 from log file 1002. The debugger can determine if the value of the new process identifier field (e.g., newPID, etc.) recorded in next log record 1006 is valid, indicating that a new process is created (e.g., child process, etc.) by the current process identified in next log record 1006. In next log record 1006, the new process identifier field value is 1273, indicating that new (e.g., child) process 1273 is created by the current process (e.g., 1269) of next log record 1006. The debugger searches the log file to try to find a first log record whose current process identifier (e.g., currentPID, etc.) matches the new process identifier field (e.g., newPID, etc.) recorded in next log record 1006, which is process 1273 here. The log record 1008 is identified as the first log record whose current process identifier (e.g., currentPID, etc.) is 1273. The debugger updates the program counter address with the current address recorded in log record 1008 (e.g., "0x22ce1f26").

If the value of the new process identifier field (e.g., newPID, etc.) recorded in log record 1008 is valid, indicating that a new process is created (e.g., child process, etc.) by the current process identified in log record 1008. If the new process identifier field (e.g., newPID, etc.) is valid, the debugger tries to find the first whose current process identifier (e.g., currentPID, etc.) matches the new process identifier field (e.g., newPID, etc.). If the new process identifier field (e.g., newPID, etc.) is valid (e.g., not zero (0), etc.), the debugger fetches the next log record.

In log record 1008, the new process identifier field value is 1274, indicating that new (e.g., child) process 1274 is created by the current process (e.g., 1273) of next log record 1008. The debugger searches the log file to try to find a first log record whose current process identifier (e.g., currentPID, etc.) matches the value of the new process identifier field (e.g., newPID, etc.), 1274, of log record 1008. In this case, the debugger identifies log record 1010 as the first log record whose current process identifier (e.g., currentPID, etc.) is 1274. The debugger updates the program counter address with the current address recorded in log record 1010 (e.g., "0x22ce2422"). The debugger can continue to perform the child process follow as described.

Figure 11:
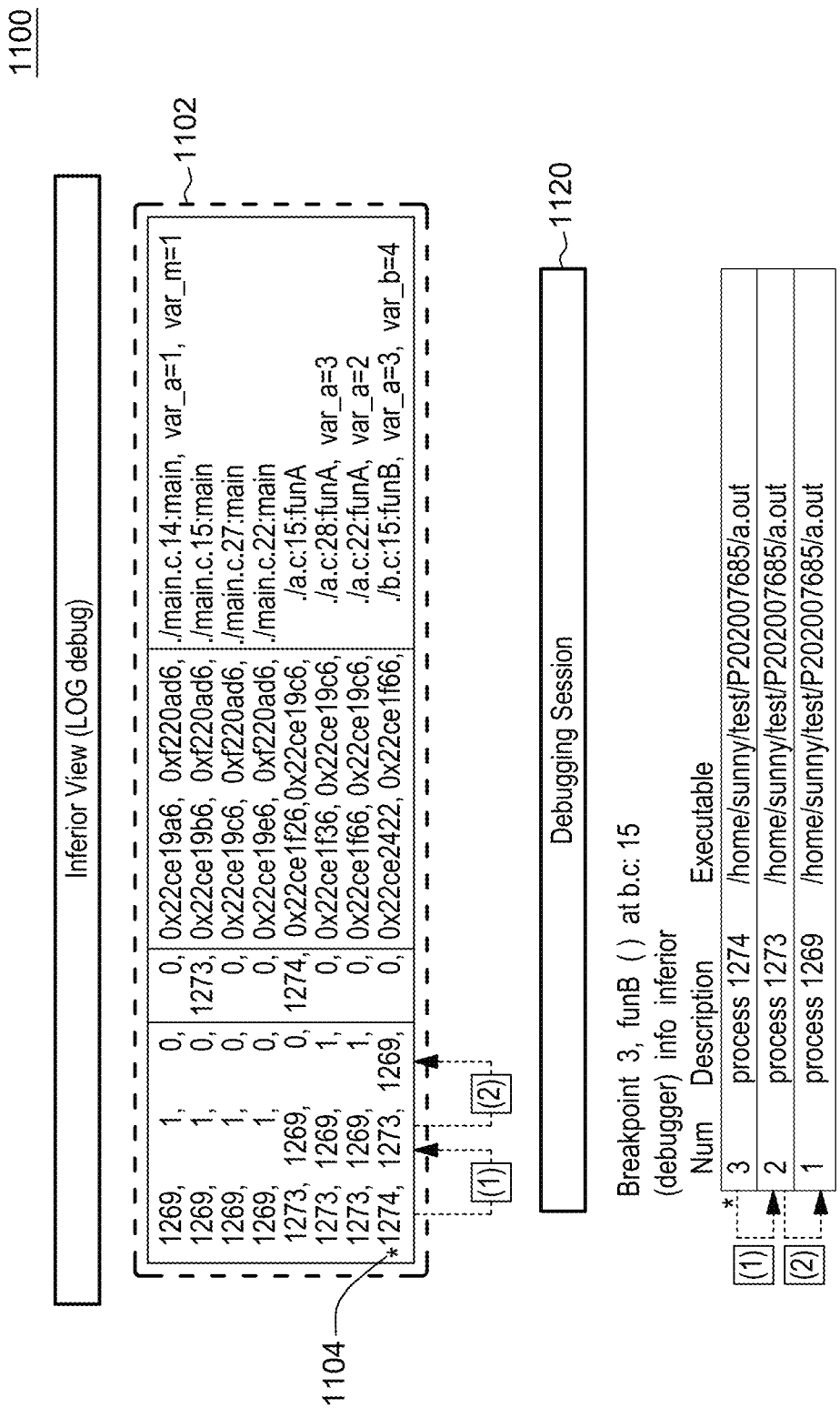
FIG. 11 depicts a block diagram of an example inferior view for log multi-process debugging, according to embodiments of the present invention.

FIG. 11 depicts a block diagram of an example inferior view 1100 for log multi-process debugging, according to embodiments of the present invention. As illustrated in FIG. 11, a log file 1102 is obtained for a multi-process log debug. The asterisk at log record 1104 indicates that the process of log record 1104 (e.g., process 1274) is currently being inspected by the debugger. The debugger can identify all the family process identifiers recorded in a current log record to provide a view of all inferiors, for example, as shown in debugging session window 1120.

As illustrated in FIG. 11, the debugger can determine if a value of the parent process identifier field (e.g., ParentPID, etc.) of the current log record, log record 1104, is greater than one (1). The debugger can update the parent process identifier (e.g., ParentPID, etc.) for the inferior view with process 1273 and can fetch the number 2 process for the inferior view, as shown in debugging session window 1120.

If the depth of the family process tree (e.g., variable N, etc.) is greater than two (2), the debugger can continue to identify the family process identifiers recorded in a current log record, log record 1104. For example, the debugger can determine if a value of the grandparent process identifier field (e.g., gParentPID, etc.) of the current log record, log record 1104, is greater than one (1). The debugger can update the grandparent process identifier (e.g., gParentPID, etc.) for the inferior view with process 1269 and can fetch the number 1 process for the inferior view, as shown in debugging session window 1120. The debugger can continue to identify family process identifiers until all the members of the family process tree for the current log record are obtained.

Figure 12A:
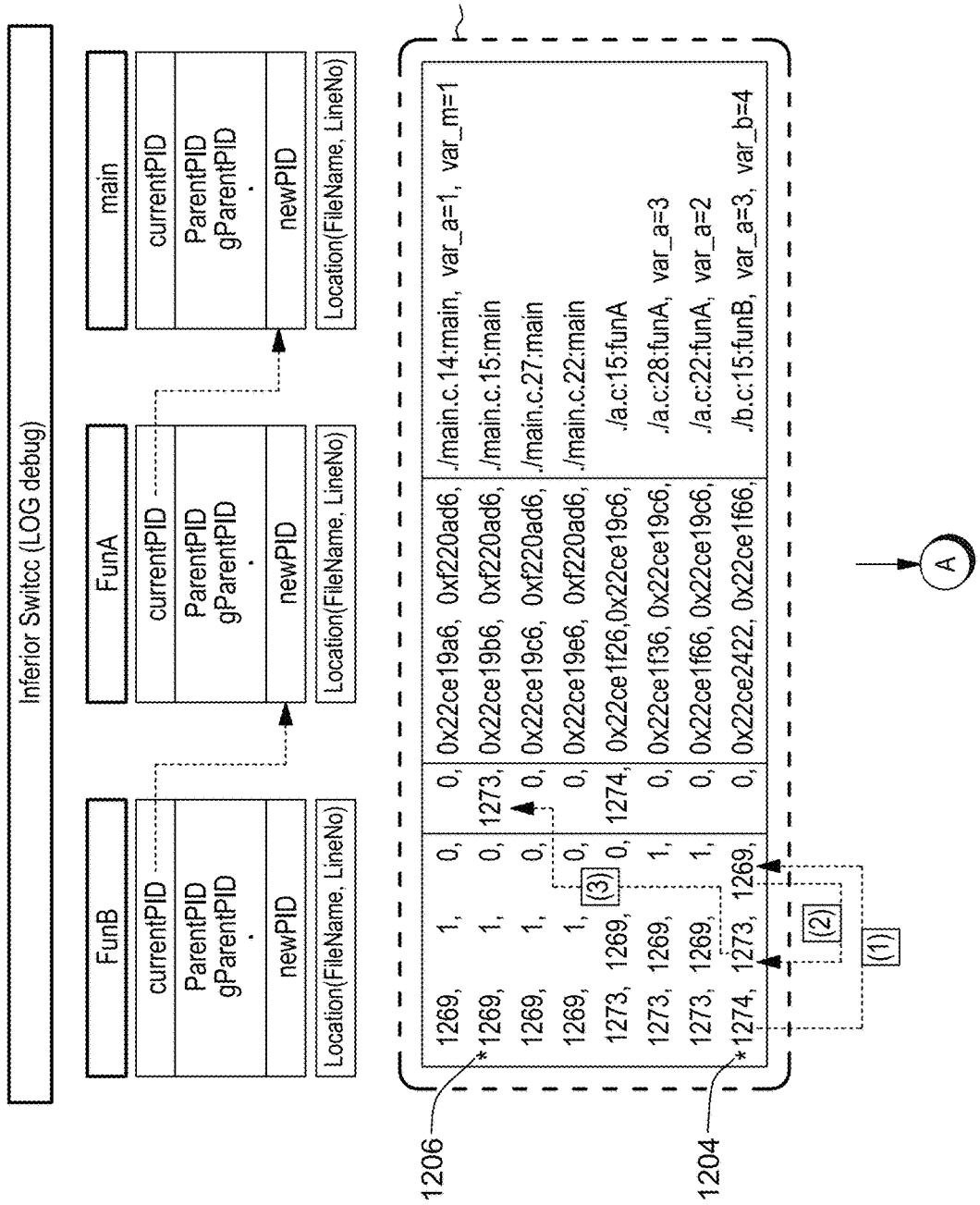

FIGS. 12A and 12B depict a block diagram of an example inferior switch 1200 for log multi-process debugging, according to embodiments of the present invention. As illustrated in FIGS. 12A and 12B, a log file 1202 can be obtained for a multi-process log debug. The family process tree members recorded in log record 1204 of log file 1202 provided the first inferior view shown in debugging session window 1120. The current process in the inferior view is entry 1222, "number 3 process 1274," as shown in debugging window 1220. In the example illustrated in FIGS. 12A-B, the debugger is to switch inferior to "number 1, process 1269," the grandparent process identifier of log record 1204, as shown in the debugging session window 1220.

The debugger can determine if there is a child process of the target process identifier (e.g., targetPID, etc.) for the inferior switch and determine if the child process identifier of the target process valid. In this case, the target process identifier is 1269 and its child process identifier is 1273. If the child process identifier is not valid, the debugger can locate a first log record whose current process identifier (e.g., CurrentPID, etc.) matches the target process identifier (e.g., targetPID, etc.), for example, target process identifier 1269.

If the child process identifier is valid, the debugger can search the log records with a current process identifier (e.g., CurrentPID, etc.) matching the target process identifier (e.g., log records with a CurrentPID of 1269) to locate a log record whose new process identifier (e.g., NewPID, etc.) matches the child process identifier (e.g., 1273) of the target process identifier (e.g., 1269). Here the located log record with a current process identifier (e.g., CurrentPID) of 1269 and a new process identifier (e.g., NewPID, etc.) of 1273 would be log record 1206.

If no log record can be located with a current process identifier (e.g., CurrentPID, etc.) matching the target process identifier (e.g., target PID, etc.) that also has a new process identifier (e.g., NewPID, etc.) matching the child process identifier of the target process identifier, then the debugger can locate a first log record whose current process identifier (e.g., CurrentPID, etc.) matches the target process identifier (e.g., targetPID, etc.), for example, target process identifier 1269.

The debugger can update the current program counter and the current program identifier based on the located log record. In this case, the current program counter can be updated to "0x22ce19b6" and the current process identifier can be updated to "1269" based on log record 1206. The debugger can also update the parent process identifier and the grandparent process identifier based on the located log record. The current inferior then switches to "number 1" as shown by entry 1224 of debugging session window 1220.

Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
   determining that a log multi-process debug mode is specified;
   obtaining a log file for debugging a source code, wherein the log file includes a plurality of log records including respectively corresponding process identifiers populating a plurality of process identifier fields;
   processing the log file by inserting a new log record with a new process identifier into the log file for a created new process;
   providing for performance of debugging for the source code based in part on the plurality of process identifier fields; and
   switching to a different inferior process while debugging the source code by:
      obtaining a target process identifier of the different inferior process;
      determining whether the target process identifier is located in a process family tree for the new log record;
      in response to determining the target process identifier is located in the process family tree for the new log record, obtaining a child process identifier of the different inferior process;
      identifying a located log record included in the log file, the located log record having the new process identifier equal to the child process identifier for the different inferior process; and
      updating a debugger current program counter and a debugger current process identifier based on the located log record.

2. The computer-implemented method of claim 1, wherein the plurality of process identifier fields includes:
   a current process identifier field;
   a parent process identifier field;
   a grandparent process identifier field; and
   a new process identifier field.

3. The computer-implemented method of claim 1, wherein the plurality of process identifier fields are inserted into the log records based on a depth of the process family tree.

4. . The computer-implemented method of claim 1, further comprising:
   obtaining a specified process identifier;
   identifying a first log record having a current process identifier equal to the specified process identifier; and
   updating a debugger program counter address using a current address field of the identified first log record to provide the debug process attach mode.

5. The computer-implemented method of claim 1, further comprising:
   obtaining a next log record included in the log file;
   determining if a specified process identifier of the next log record is valid, wherein a valid specified process identifier indicates that an additional process is created;
   identifying a first matched log record, wherein a matched log record is a log record having a current process identifier equal to the specified process identifier of the next log record; and
   updating a debugger program counter address using a current address field of the first matched log record to provide the debug parent/child process mode.

6. The computer-implemented method of claim 1, further comprising:
   obtaining a current process identifier for a current process currently being inspected;
   identifying a current process log record included in the log file having a same current process identifier as the current process being inspected;
   obtaining a process identifier value for each family process identifier field in the current process log record having a valid process identifier value, wherein each obtained process identifier value represents a process that is a member of a process family tree for the current log record; and providing the debug inferior view based on the obtained process identifier values from the current log record.

7. A computer program product comprising a computer readable storage medium having stored thereon:

program instructions programmed to determine that a $loc_i$ multi-process debug mode is specified;

program instructions programmed to obtain a log file for debugging a source code, wherein the log file includes a plurality of log records including respectively corresponding process identifiers populating a plurality of process identifier fields;

program instructions programmed to process the log file by inserting insert a new log record with a new process identifier into the log file for a created new process;

program instructions programmed to provide for performance of debugging for the source code based in part on the plurality of process identifier fields; and program instructions programmed to switch to a different inferior process while debugging the source code by:
  obtaining a target process identifier of the different inferior process;
  determining whether the target process identifier is located in a process family tree for the new log record;
  in response to determining the target process identifier is located in the process family tree for the new log record, obtaining a child process identifier of the different inferior process;
  identifying a located log record included in the log file, the located log record having the new process identifier equal to the child process identifier for the different inferior process; and
  updating a debugger current program counter and a debugger current process identifier based on the located log record.

8. The computer program product of claim 7, wherein the plurality of process identifier fields includes:
  a current process identifier field;
  a parent process identifier field;
  a grandparent process identifier field; and
  a new process identifier field.

9. The computer program product of claim 7, wherein the plurality of process identifier fields are inserted into the log records based on a depth of the process family tree.

10. The computer program product of claim 7, the computer readable storage medium having further stored thereon:
  program instructions programmed to obtain a specified process identifier;
  program instructions programmed to identify a first log record having a current process identifier equal to the specified process identifier; and
  program instructions programmed to update a debugger program counter address using a current address field of the identified first log record to provide the debug process attach mode.

11. The computer program product of claim 7, the computer readable storage medium having further stored thereon:
  program instructions programmed to obtain a next log record included in the log file;
  program instructions programmed to determine if a specified process identifier of the next log record is valid, wherein a valid specified process identifier indicates that an additional process is created;
  program instructions programmed to identify a first matched log record, wherein a matched log record is a log record having a current process identifier equal to the specified process identifier of the next log record; and
  program instructions programmed to update a debugger program counter address using a current address field of the first matched log record to provide the debug parent/child process mode.

12. The computer program product of claim 7, the computer readable storage medium having further stored thereon:
  program instructions programmed to obtain a current process identifier for a current process currently being inspected;
  program instructions programmed to identify a current process log record included in the log file having a same current process identifier as the current process being inspected;
  program instructions programmed to obtain a process identifier value for each family process identifier field in the current process log record having a valid process identifier value, wherein each obtained process identifier value represents a process that is a member of a process family tree for the current log record; and
  program instructions programmed to provide the debug inferior view based on the obtained process identifier values from the current log record.

13. A computer system comprising:
  a processor set; and
  a computer readable storage medium;
wherein:
the processor set is structured, located, connected and programmed to run program instructions stored on the computer readable storage medium; and
the stored program instructions include:
  program instructions programmed to determine that a log multi-process debug mode is specified;
  program instructions programmed to obtain a log file for debugging a source code, wherein the log file includes a plurality of log records including respectively corresponding process identifiers populating a plurality of process identifier fields;
  program instructions programmed to process the log file by inserting a new log record with a new process identifier into the log file for a created new process;
  program instructions programmed to provide for performance of debugging for the source code based in part on the plurality of process identifier fields; and
  program instructions programmed to switch to a different inferior process while debugging the source code by:
    obtaining a target process identifier of the different inferior process;
    determining whether the target process identifier is located in a process family tree for the new log record;
    in response to determining the target process identifier is located in the process family tree for the new log record, obtaining a child process identifier of the different inferior process;
    identifying a located log record included in the log file, the located log record having the new process identifier equal to the child process identifier for the different inferior process; and updating a debugger current program counter and a debugger current process identifier based on the located log record.

14. The computer system of claim 13, wherein the plurality of process identifier fields includes:
   a current process identifier field;
   a parent process identifier field;
   a grandparent process identifier field; and
   a new process identifier field.

15. The computer system of claim 13, the stored program instructions further including:
   program instructions programmed to obtain a specified process identifier;
   program instructions programmed to identify a first log record having a current process identifier equal to the specified process identifier; and
   program instructions programmed to update a debugger program counter address using a current address field of the identified first log record to provide the debug process attach mode.

16. The computer system of claim 13, the stored program instructions further including:
   program instructions programmed to obtain a next log record included in the log file;
   program instructions programmed to determine if a specified process identifier of the next log record is valid, wherein a valid specified process identifier indicates that an additional process is created;
   program instructions programmed to identify a first matched log record, wherein a matched log record is a log record having a current process identifier equal to the specified process identifier of the next log record; and
   program instructions programmed to update a debugger program counter address using a current address field of the first matched log record to provide the debug parent/child process mode.

17. The computer system of claim 13, wherein the plurality of process identifier fields are inserted into the log records based on a depth of the process family tree.

18. The computer system of claim 13, the stored program instructions further including:
   program instructions programmed to obtain a current process identifier for a current process currently being inspected;
   program instructions programmed to identify a current process log record included in the log file having a same current process identifier as the current process being inspected;
   program instructions programmed to obtain a process identifier value for each family process identifier field in the current process log record having a valid process identifier value, wherein each obtained process identifier value represents a process that is a member of a process family tree for the current log record; and
   program instructions programmed to provide the debug inferior view based on the obtained process identifier values from the current log record.

* * * * *